United States Patent [19]

Tillie

[11] 4,251,362

[45] Feb. 17, 1981

[54] METHOD OF, PRODUCTS AND DEVICES FOR PROCESSING POLLUTING MATERIALS SUCH IN PARTICULAR AS HYDROCARBONS CAST UP BY THE SEA, WASTE SLUDGES

[76] Inventor: Etienne Tillie, Route de Saint Paul, 06480 La Colle sur Loup, France

[21] Appl. No.: 43,238

[22] Filed: May 29, 1979

[30] Foreign Application Priority Data

May 30, 1978 [FR] France ................ 78 16009
Oct. 17, 1978 [FR] France ................ 78 29532
May 18, 1979 [FR] France ................ 79 12702

[51] Int. Cl.³ .............................................. C02F 1/00
[52] U.S. Cl. .............................. 210/705; 210/711; 210/713; 210/723; 210/738
[58] Field of Search .............. 210/18, 140, 42 R, 45, 210/49, 50, 52, 53, 54, 59, 63 R, 65, 66, 70, 170, 241, DIG. 26, DIG. 27; 71/11, 24, 63, 23, 64 SC; 405/128, 129, 263, 266

[56] References Cited

U.S. PATENT DOCUMENTS

| | | | |
|---|---|---|---|
| 3,565,796 | 2/1971 | Levin | 210/18 |
| 3,580,715 | 5/1971 | Dilday | 71/64 DB |
| 3,617,539 | 11/1971 | Grutsch | 210/18 |
| 3,720,609 | 3/1973 | Smith | 405/263 |
| 3,725,029 | 4/1973 | Blackmore | 71/64 E |
| 3,781,201 | 12/1973 | Carmichael | 210/DIG. 27 |
| 3,820,970 | 6/1974 | Watkins | 71/63 |
| 3,919,112 | 11/1975 | Fusey | 210/DIG. 27 |
| 4,153,555 | 5/1979 | Acker et al. | 210/241 |

FOREIGN PATENT DOCUMENTS

| | | | |
|---|---|---|---|
| 740217 | 3/1970 | Belgium | 210/DIG. 27 |
| 1944679 | 3/1971 | Fed. Rep. of Germany | 210/DIG. 27 |
| 1595406 | 7/1970 | France | 210/DIG. 26 |

OTHER PUBLICATIONS

Hackh's Chemical Dictionary, McGraw-Hill Book Co., 1969, p. 310.

*Primary Examiner*—Ernest G. Therkorn
*Attorney, Agent, or Firm*—Steinberg & Raskin

[57] ABSTRACT

The invention relates to a method of treating in particular polluting materials such as hydrocarbons. Said materials are processed with at least one basic product such as hydraulic, natural organic or synthetic binder and in particular the calcium sulphate semi-hydrates showing qualities required for a quick setting, hardening, sequestration and retention. More particularly, the basic products used are calcium sulphate semi-hydrates in the form ALPHA. Said basic products may be also used for the processing of residual sludges or waste waters.

14 Claims, 1 Drawing Figure

U.S. Patent
Feb. 17, 1981
4,251,362
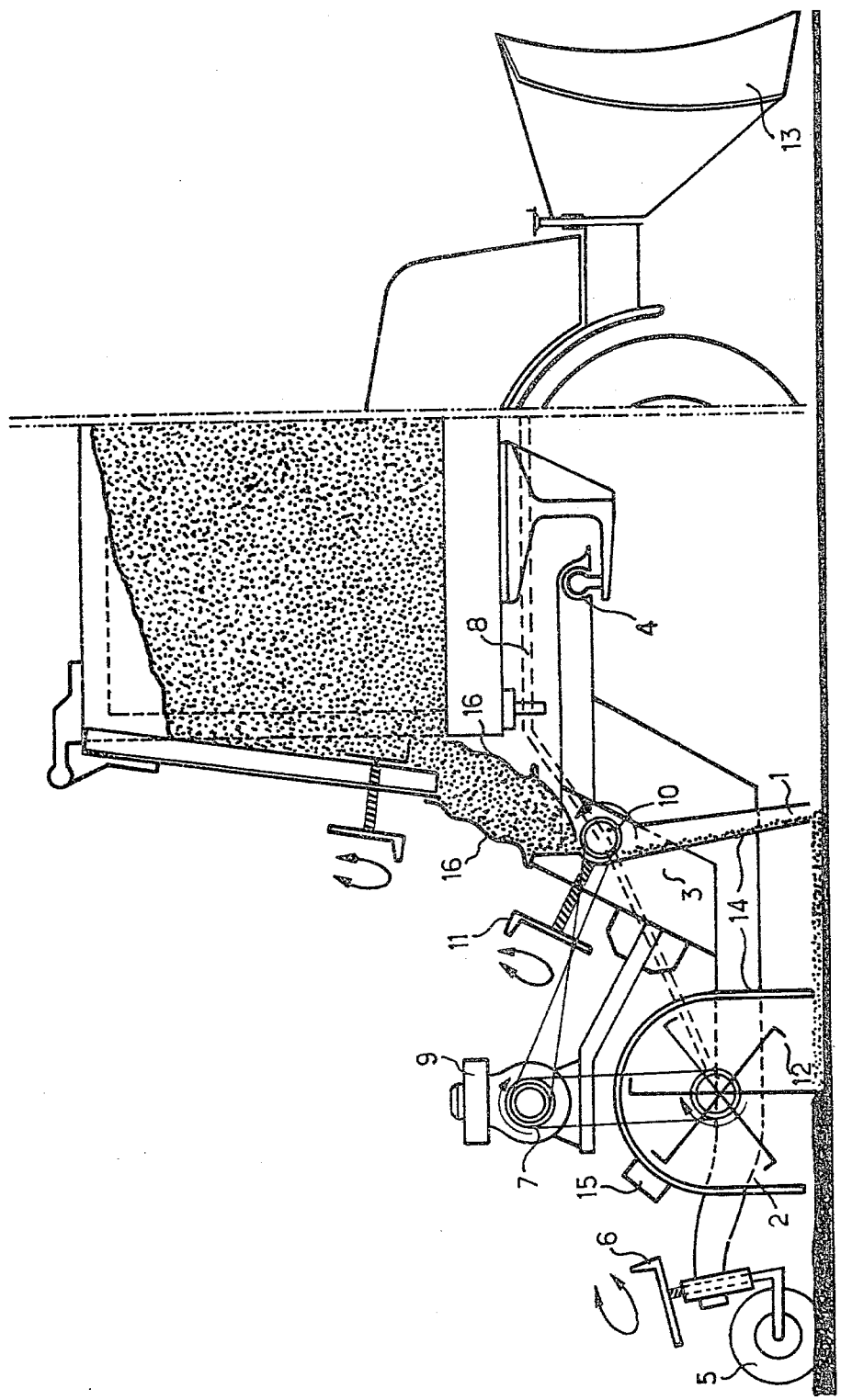

METHOD OF, PRODUCTS AND DEVICES FOR PROCESSING POLLUTING MATERIALS SUCH IN PARTICULAR AS HYDROCARBONS CAST UP BY THE SEA, WASTE SLUDGES

The invention relates generally to a method of, products and devices for processing polluting materials and is more particularly directed to the treatment of hydrocarbons accidently or deliberately discharged into the sea by oil tanker ships such hydrocarbons being likely to be processed when the form sheets at the water surface and also on the beaches when these hydrocarbons have reached the coasts or shores as well as to the treatment of the waste waters and residual sludges whatever their origin and consistance may be and in particular those originating from the sewage treatment plants.

In the present stage of the known means for preventing the pollution of the beaches and shores caused in particular by hydrocarbons discharged into the sea, it appears that any effective system of protection and recovery is lacking. Such a situation is due to the nature of the pollutant as well as to the extent of the catastrophe. In some cases, one is limiting oneself to transfer the pollution to another place and in other cases it seems that the cure is worse than the evil unless one chooses as an easy way out to wait for the biodegradation of the crude oil which may last years.

Two methods are however presently known for cleaning the polluted beaches and grounds. One of them is mechanical but unsuited and the other one is manual but hazardous.

The mechanical method, when self-propelled or automotive of moving gear commonly referred to as bulldozers, scrapers, powered self-loaders are available consist in heaping up the sand admixed with the hydrocarbons and clearing or removing same by means of trucks or lorries fitted with tipping or dump bodies. The banking or filling up is carried out on land either in heap formation or into natural holes or excavations.

The manual method consists in digging by hand from place to place shallow holes into the sand and collecting there the layer of hydrocarbon with a shovel while gradually extracting the crude oil therefrom progressively either by means of a bucket or pail with a view to filling tanks therewith or by means of special pumps of the so-called liquid manure pump type capable of sucking and delivering viscous or "loaded" liquids. The conveyance is then carried out through trucks or lorries or railway tank cars.

Both of the aforesaid methods are the only ones to be presently applied. It should be admitted that one of them is unsuited and lacks effectiveness whereas the other one is time-consuming and expensive.

In the case of the mechanical method the use of earth moving gear or equipment compulsorily results in the removal of large amounts of sand which are disproportionate to the bulk of crude oil contained in situ. The hydrocarbons admixed with the sand are not recoverable either as oil or burnable material. Morover, this incomplete and rough cleaning process which consists in extracting from one place the pollutant materials which have gathered there so as to transfer them to other places without previously asking the advice of the population living in the neighborhood would straightforwardly result in sterilizing acres of land, forming areas which are dangerous for man and animals and at least spoiling the landscape and depreciating the values of the pieces of grounds located nearby. Within a period of time these polluting materials processed in such a manner are likely to move under the action of the natural elements and are likely to poison the ground-watertables. Moreover, in summer the deleterious gases are then likely to evolve under the action of heat, to inconvenience a whole region and to catch fire or blaze up spontaneously or accidentally. This method is an actual and serious danger for the population living in the neighborhood, the walkers or pedestrains and the animals.

In the case of the manually operated method it is necessary to make use of a substantial labor which should be fitted with a suitable protection equipment. Several thousands of persons may therefore be exposed to the hazards of intoxication and allergy thereby requiring an indispensable medical supervision. Moreover, the work is long, tedious, hard and discouraging: more especially as the next tide will remove any traces of the foregoing intervention so that it should be started again. It should however be pointed out that the crude oil thus collected may be sent to the refineries for undergoing there the cracking steps of the normal refining cycle. Nevertheless, the hydrocarbons thus recovered may contain sea water, residues of aquatic plants and even sand. It results therefrom after settling an awkward body of product difficult to be neutralized.

An object of the invention is to solve all the problems set by the prior art methods which have proved to be of unsuited and rudimentary character, to avoid the inconveniences and it provides for this purpose a particular, new and fully integrated engineering process relying upon the use of various materials adapted to trap or to confine these hydrocarbons promptly. The method makes it possible to convert the hydrocarbons into a solid plate which would facilitate the removal thereof while leaving a clean uncovered ground; it provides for the suitable storage and without any danger of the recovered materials and makes it possible to use same later for power generating purposes as a granular fuel or burnable material. In other words, the method according to the invention makes it possible to completely and quickly clean the beaches between two tides or by temporarily giving up the covering thus formed it prevents the infiltration of the hydrocarbons likely to settle again during successive abb and flow.

As to the present state of the technology relating to the recovery at sea of the hydrocarbons originating from a natural or accidental "spillage", from a marine disaster or even from a simple degasing operation, the oil is collected by pumping and transferred aboard of other oil tanker ships. On the one hand the use of floating slub-like members adapted to limit the scattering or dispersal of the polluting materials and even to gather same together would essentially depend upon the atmospheric conditions and the state of the sea. It is admitted that above a threshold of a so-called "force 5" corresponding to troughs of wave ranging from 2.5 m to 4 m, the pumping method is impossible, dangerous and accordingly inoperative. On the other hand the use of chemical or organic products such as dispersant agents, detergent agents, solvent agents, emulsifier agents or merely with an oleophile character would lead to a new form of pollution which would add itself to the foregoing and is still more harmful for the biomass.

The method according to the invention also aims at solving the problems set by the prior art methods, avoilding their inconveniences owing to the use of particular products making it possible to effectively confine or trap the hydrocarbons without however failing to comply with the safety requirements at sea and the safeguard of the nature.

At last in the present state of the technology it is known that residual sludges form a cumbersome waste difficult to remove and raising problems of any order and steadily increasing with which are faced the communities, factories, laboratories, hospitals etc. and the physical-chemical solution of which may be organized locally only at a great expense including the provision of a basic transport equipment for land carriage or river transport. The engineering processes applied to such residual sludges for causing them to be stabilized, to be reduced in bulk and to provide for their integration or disintegration according to circumstances are always expensive in view of their complexity, the requirements of supervision and maintenance in an evil-smelling medium and power expenditures. The known engineering processes are coming up against incredible difficulties: however they require the building of tanks or vats of large surface areas in the case of "drying beds" filled for months with stagnate water undergoing the natural but hazardous and seasonal phenomenon of evaporation or they rely on substantial filtration, centrifugation and thermally achieved dehydration equipment. Moreover the difficulties of separating liquid and solid elements are increased by the colloidal character generally exhibited by the sludges.

The method according to the invention has also for its purpose to solve all the problems set by the prior art methods of treating the residual sludges, which methods are more or less rudimentary, incomplete or unhealthy or still are deemed to be too expensive, to avoid the inconveniences by providing to this end a particular simple engineering process suited to the requirements of public health, and which is reliable and adaptable to any kinds of waste water, sewage or residual sludges whatever their origin and their consistance may be, which are produced or not in an aerobic or anaerobic manner while covering a restrictive surface area only and likely if need be to integrate themselves in some cases into existing plants without requiring substantial transformations thereof.

The method according to the invention relies to the use of various products adapted at first to facilitate and then to accelerate and to sustain the process of settling and reduction in bulk of the residual sludges with a more or less substantial water content by separation and quick concentration of the particles in suspension thereby making possible the extraction and easy removal of the major part of the excess water.

It appears from the foregoing that the method according to the invention is capable of effectively solving in particular the problem of the pollution of the beaches by hydrocarbons, the problem of recovering at sea of the hydrocarbons before same have reached the shores and the problem raised by the residual sludges and this owing to the use of particular chemical products or ingredients which meet every requirement which may be imposed on such treatments.

The invention is therefore characterized for the processing of said pollutant bodies given by way of example, by the use of chemical products or ingredients such as mineral so-called "hydraulic" and/or organic natural or synthetic binders exhibiting qualities of quick setting, hardening, sequestration and retention.

According to another characterizing feature of the invention the method consists in using as basic hydraulic binders the calcium sulphate semi-hydrates for instance in the form BETA and preferably in the form ALPHA such binders being available in powder form.

According to another characterizing feature of the invention the method consists in using as basic hydraulic binders the anhydrites in the BETA and/or ALPHA forms.

According to another characterizing feature of the invention the method consists in using mixtures or blends of binders such as those previously mentioned with possibly the addition of other fine materials such as additives and/or corser materials such as peat for instance so as to substantially increase the sequestration and retention capacity of the product.

Further advantages, characterizing features and details of the invention will appear more clearly as the following explanatory description proceeds with reference to the accompaning diagramatic drawing given by way of non-limiting example only illustrating a presently preferred specific embodiment of the invention and wherein the single FIGURE shows a simplified view in longitudinal section of a device for treating hydrocarbons shed on a beach for instance.

There will be now described in detail the method according to the invention applied to the processing of hydrocarbons cast up on the beaches, to the treatment of feats or layers of hydrocarbons present at the surface of the sea water and to the treatment of residual sludges or sewage, respectively.

The invention thus provides in the case of the pollution of beaches:

the ready use of several possible materials adapted to sequestrate the layer of hydrocarbon such as it is present on the beaches after the sea has receeded and whatever its thickness and viscosity may be even in the presence of variable amounts of sea water and of residues of aquatic plants and this in a short time ranging from a few minutes to half an hour but which can be kept under control and is inversely proportional to the quality of the mixture and additives as well as to the rate of mixing;

the conversion of the layer of hydrocarbon into a continuous plate the strength of which is proportional to the qualities of the materials used (percentage) and to the amounts of mixed materials (thickness, rate of mixing) but inversely proportional to the desired percentage of sequestrated hydrocarbons (this percentage appearing in one case to be of about 70% by volume) as well as to the rate of mixing with water;

the use of a specific spreading and blending equipment which is not very expensive, is easily adaptable on trucks or lorries fitted with tipping bodies or dumps (while providing in some instances high racks or rails owing to the rather low specific gravity of some types of mixtures) and which provide for a more or less substantial flow rate to form a "curtain" of ingredients at a given speed on a width of 2.50 m for instance (road transport clearance);

the removal after solidification of the plate or slab thus formed, which removal is made easier and faster by means of conventional loaders for clearing and storage purposes in accordance with two general choices: quick clearing a few minutes after spreading and mixing with the hydrocarbons and as soon as the plate has set or provisionally leaving the slab on the spot. This provisional relinquishment may be accounted for either because the time available between two tides is insufficiently long or because it is desired to form a temporary protection against the infiltrations in depth into the sand, either through the initial supply or new deposits of hydrocarbons. In effect, the mechanical sucking (and accordingly impregnation) action due to the receeding of the sea is particularly harmful since the pollution does not only take place at the surface but reaches through the whole thickness of the sand. At least, since the percentage in mixing water is too high and the major portion of the excess water which has not combined with the basic binder should be allowed to flow away;

the power integration in a burnable granular form of said plate, the ashes being that likely to be used in some cases when anhydrous calcium sulphate for instance is used, for the improvement of heavy soils.

As previously stated a characterizing feature of the method of processing the hydrocarbons deposited on the beaches consists in using a basic binder such as plaster and in a more favourable way calcium sulphate semi-hydrate in the form ALPHA of ordinary quality or grade admixed or not, blended or not with other hydraulic or organic binders and/or with organic substances acting as water and/or pertroleum retaining agents for instance.

The following mixtures have been tested with success in particular:

calcium semi-sulphate in the form ALPHA plus hydrocarbons as such containing very little sea water plus peat;

calcium sulphate semi-hydrate in the form ALPHA plus hydrocarbons as such containing more or less high percentages of sea water plus peat.

A number of additives have been tested. The current results have given a sequestration capacity of 50% to 60% by volumes of hydrocarbons. By way of example the following mixture (in terms of volumes): calcium sulphate semi-hydrate in the form ALPHA without any additive (1 part), plus crude mineral oil as such (1,2 part) plus peat (1 part) has yielded in weight for 100 g: calcium sulphate semi-hydrate as such and peat as such (44 g), petroleum as such sequestrated (56 g).

The results of many undertaken systematic tests concerning the selection of hydraulic and organic binders prove to be very variable; whether they are used in a pure condition for some of them and/or in associated relationship for others; between themselves and/or with other materials and provided that various precautions of use be taken and the general scheme line set by the gist of the invention be followed.

It appears that it is the calcium sulphate semi-hydrate in the form ALPHA (and some other grades of anhydrites) which has allowed to sequestrate the highest percentage of hydrocarbons in a very short time while exhibiting good qualities of mechanical strength even in the absence of sea water other than in the form of traces.

It should be called to mind again here that the reaction of combination of the current plasters in the form BETA and of the calcium sulphate semi-hydrates in the form BETA requires the use of amounts of water very much larger than those required by theory for reasons of workability only. The chemical reaction of the calcium sulphate semi-hydrates in the presence of water is the following:

$$SO_4Ca \cdot \tfrac{1}{2}H_2O + 1\tfrac{1}{2}H_2O = SO_4Ca \cdot 2H_2O$$

(exothermic reaction)

For the sake of simplification the amounts of water entering the chemical combination are approximatively the following for 100 g of calcium sulphate semi-hydrate:

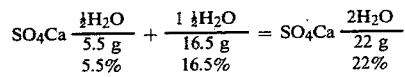

In a pratical case the mixing rates $$\frac{WATER}{PLASTER} \; (\tfrac{E}{P})$$

are often ranging from (80/100) to (100/100) and sometimes even more.

In other words in order to comply to the requirements of workability of plasters in general it is indispensible to mix them with 5 to 6 times more water than the amount theoretically required for inducing the combination of partially dehydrated calcium sulphate to the approximation of half a molecule of water. Conversely by decreasing the mixing rate the workability would decrease and become practically impossible below 50% (except for the addition of additives and a mechanical intervention) but the setting time would also be decreased. Nevertheless this last advantage does not compensate for the foregoing inconvenience which would have the consequence of too heavily burden the price of clearing and transport in such a case.

Calcium sulphate semi-hydrate in the form ALPHA (and some anhydrites) alone remain workable at mixing rates very close to the percentage of combination water provided that it be used in a suitable manner. Care should in particular be taken to avoid the agglomeration of mixtures in the mixing machines.

In particular with the calcium sulphate semi-hydrate in the form ALPHA "as such" currently tested with the ratio $E/P = (30/100)$ would yield outstanding results of workability and mechanical strength in a very short time (about 20 minutes at 17° C., conditions to use these characteristic properties in order to result in the sequestration of crude mineral oil under very good conditions of use and to improve them by incorporating other elements such as peat for instance or materials with expansing or retention qualities; in order to impart to the materials the required qualities such as the formation of cavernous bodies capable of favourably affecting the later combustion of the hydrocarbons and this whatever the conditions of moisture, water content, presence of waste materials and so on may be; during the cleaning operations.

Furthermore the conventional or industrial use (prefabrication of plasters and cements has always been impaired or impeded by the presence of fats and oils which tend together often for instance at the bottom of the molds and oppose setting, hardening, behavior of the elements or products thereby causing a substantial waste or requiring expensive restarts of work. It happens that apparently the sequestration power of calcium sulphate semi-hydrate in the form ALPHA (and of some anhydrites) does not exhibit such an extreme drawback when it is properly used. If there is an actual impairment of its resulting mechanical qualities the latter nevertheless remain quite sufficient for obtaining a continuous rigid plate which may be quickly removed while leaving a quite clean uncovered stretch of ground.

Now the mechanical qualities of calcium sulphate semi-hydrate in the form ALPHA used in a pure condition at very low water mixing rates (about 30%) are generally higher than those of cement, based concretes. They accordingly provide for the possibility of admixing it at low percentages to water retaining products or crude mineral oil for instance which are cheap, are found at close proximity (peat in Brittany) and which impart to the products thus obtained an outstanding cavernous structure making them lighter and more brittle but however strong enough.

Advantage should also be taken of a particularity of calcium sulphate semi-hydrate in the form ALPHA. When indeed the mixture in the presence of water is suitably prepared the calcium sulphate semi-hydrate in the form ALPHA would very easily and very quickly exsude excess water of clean appearance without as much considerably prejudicing the good final mechanical qualities. Such are in particular the results of numerous test runs carried out in the presence of large amounts of water.

In summary the mixtures obtained are characterized by:
a high power of sequestration of hydrocarbons (up to 70%),
good resulting mechanical qualities,
a quick setting in the presence and in the absence of sea water (except when in the form of traces),
a good capability of segrating excess sea water of clean appearance.

The transformation into a more or less thick rigid slab or plate or also into an appearance of so-called continuous crust which may be easily cleared and leaving an exposure of ground particularly clean is obtained by mixing said aggregates in predetermined amounts by means of dump trucks or lorries of current type. Referring more particularly to the drawing there is shown a truck fitted at the rear with a spreading device 1 and with a powerful stirring device 2. The whole equipment is designed so as to follow the unevenness or variations in level of the ground, to deliver variable amounts of powdery product in accordance with the thickness of the layer of hydrocarbon deposited, stirred close to the ground not impregnated with the powdery mixture - crude oil compound irrespective of its thickness. The machine is protected by a hood or casing 3 comprising one single ball-and-socket type fastening point 4 at the rear part of the truck. The machine is resting on the ground through the agency of two wheels 5 fitted with a screw adjusting device 6 for providing a more or less great ground clearance with a view to adapting to the unevenness or variations in ground level, to the thicknesses of the deposits and to reduce the incorporation of sand as much as possible. The delivery and stirring mechanisms 7 may be easily thrown out of or into gear and are of friction type so as to avoid the sudden stop of parts being moving and the breaking thereof and are either coupled direct to one of the rotating members 8 of the truck or driven by an auxiliary engine but in any case at variable speeds.

The part 1 corresponding to the spreading action consists for instance of a worn screw 10 made of rubber with a wear takeup adjustment means 11. The part 2 corresponding to the stirring action is fitted with a rotary shaft provided with blades or veins 12 revolving at a high velocity and preferably exhibiting some flexibility or yieldingness in order to absorb shocks due to the collision with various materials such as stones, pieces of wood, packs of sea-weed. Alternatively the machine may preferably be fitted with rigid steel knives capable of cutting or slashing to pieces the waste materials brought by the sea. The truck should also be provided at its front end with a real guard 13 the slope of which with respect to the forward motion of the truck would allow to bring the remnents back onto the part already treated and having reached a point of sufficient hardness.

Some particularities of the machine depicted on the FIGURE should be noted. In particular the part corresponding to the spreading action should be located ahead (in the direction of run) of the part corresponding to the stirring action separated by an intermediate hood or casing 14 in order to prevent the splashes or spatters produced by the blades 12 from clogging while setting the distribution or scattering of the powdery substances. On the other hand the direction of rotation of the blades should be the same as that of the wheels of the vehicle. The possible cleaning of the hood or casing of the stirring device 2 from the mud due to the dirt and projected matter is carried out by means of a vibrator 15 operating intermittently thereby enabling the whole to be kept in a constant state of cleanliness. There is at least provided a flexible connection or hose 16 made from rubber for instance so as to guide and convey the powdery products towards the spreading case and in order to avoid dust.

It should be understood that the description of the device used for implementing the method according to the invention is not limited to the system described and shown in the drawing which has been given by way of example only and simplified on purpose for a better understanding. Many modifications and alternative arrangements may be performed thereon in particular for making the dissassembling easier or more sophisticated without however going beyond the scope of the invention.

According to another characterizing feature of the invention the mixture thus prepared generally assumes a clearer colouring so that it is possible to very easily appreciate from a remote location the progress of the works. It increases in bulk, becomes thicker and hardens or sets within a few minutes to form a plate which quickly would let excess water exsuding. The recovery of this plate the thickness of which depends on the stirred amounts of ingredients becomes almost easy and as a very significant fact leaves an exposure or stretch of clean ground with an initial appearance free from impurities and from traces of hydrocarbons. The removal may then be undertaken straight forward and the storage may take place with a view to effecting an additional drying in the case of a small incorporation of sea water. In the second case and for the reasons mentioned previously it may be advantageous or necessary to forsake on the spot the crust thus formed for some time.

The energy integration in the form of granular fuel or burnable material (much the same as coal) is made so much the easier as the mixture exhibits a good mechanical strength (in order to avoid crumbling) and the percentage of sequestrated hydrocarbons is so much the higher as it contains the greatest possible amount of peat for instance the thermal qualities of which would add to those of the crude mineral oil and the presence of which would improve at the same time the evolvement of inflammable gases through the generation of an outstandingly cavernous body.

The pallets or granulated products thus burned would be left as small whight spongy stones showing through their total colouring and the vanishing of their ill smell that the combustion of the sequestrated hydrocarbons has well been complete inclusive of tars. They assume the more or less brittle appearance of pouzzolane and in some cases consist essentially of $SO_4Ca$ adapted to be ground. They may be used in powder form for improving clayey soils ending under this appearance the cycle of complete elimination of pollution and the full recovery of said mixtures.

As clearly explained hereinbefore the method according to the invention makes it also possible to process the sheets of hydrocarbons at the surface of the sea i.e. before they would pollute the beaches or shores. For this purpose the method relies on the use and implementing of different products of variable specific gravity which may be higher than 1 in some cases and suitable for sequestrating the particles of hydrocarbons but the capacity of which to float at the water surface may remain permanent notably with respect to the resulting combined products but also with respect to the products which for particular reasons could not perform and absorbing or sequestrating function; floating capacity in a solid form making it possible to trawl and to fully recover the various pieces thus formed while avoiding any propegation of pollution at the water surface as well as within the aquatic body itself and on the sea floor, bottom or bed.

As in the foregoing application the basic product used may be calcium sulphate semi-hydrate in the form ALPHA admixed with additives and/or with other powdery products of high specific gravity such as dehydrated calcium sulphates in the form ALPHA and/or BETA. This product should of course be consistant with the conditions of use under bad weather and strong wind so that it may not be carried away by the elements and may quickly set in this particular case in the presence of hydrocarbons.

According to another characterizing feature of the method according to the invention the powdery components although exhibiting in an apparent and variable density either lower than 1 or higher than 1 and even more according to the conditions of use are admixed with additives so that the advocated product which is both very oleophile and partially hydrophobe, may float on the surface in some cases. The use of neutral coating powder with a high covering capacity is given by way of example as an additive. The portions combined with the hydrocarbons would harden or set and may float at the surface of the sea while assuming a clearer colouring as well as those which would have failed in sequestrating the mineral oil and which would distinguish by their whitish appearance. The whole may then be collected or recovered by trauling for instance.

According to a further characterizing feature of the method according to the invention the combined products have previously undergone a pre-expansion or undergo an expansion during the reaction and may float on the water surface for this reason. In other cases on the contrary they should be made denser so that they keep floating in an immersed condition or they sink so as to clog up an opening provided in a ships hull or in a cleft of the sea bottom.

According to another characterizing feature of the invention the method makes it possible to use the basic product in a pasty stabilized form as an injection under strong pressure while taking care to reactivate it at will either by means of a liquid, of a gas or of any other material.

For implementing this method in the case of the treatment of sheets of hydrocarbons there are used throwing and spreading devices operating either by sea or by air and causing the treatment and sequestration products to contact the polluting materials irrespective of the condition of the sea and the atmospheric pollutions. With the method it is possible to achieve a good steady agglomeration of the various components.

After recovery their incorporation into boilers of thermal power plants or stations is quite possible: the ashes may be recycled or are usable for amending heavy and clayey soils as well as a substrate for various fertilizers.

At last the method according to the invention relies on the use and the placement of various products adapted to promote at first, to accelerate, and to sustain afterwards the process of settling and reduction in bulk of the residual sludges with a more or less high water content through separation and quick concentration of the particles in suspension thereby allowing for the extraction and easy removal of the major part of excess water.

In the case of processing polluting materials such as residual sludges the method consists in particular in:

selecting the basic products taken as a whole or separately, added or admixed with complementary products in accordance with the desired extent of cleaning of the free waters and with the consistance of the resulting mineralized waste material composed of the sequestrated particles and of the combined ingredients, using in a ready and simple manner said basic materials taken separately or previously blended as well as their being stirred with waste waters or with the residual sludges adapted to initiate, accelerate and maintain the process of separation and segregation to eventually result in the sequestration of all the solid particles in suspension irrespective of their shape and mineral or organic origin so as to leave a free, limpid and more or less pure water depending on the object to be accomplished within a short period of time of about 15 minutes.

using a specific cheap stirring material easily adaptable on existing or non-existing tanks, converting the solid particles into a "cake" of previously defined consistance either in a brittle and pellitizable form having the appearance of a light moist soil or in the stronger form of an easily removable plate or slab, integrating into different forms of soil improving agents and fertilizers or of a complementary chemical or organic fertilizer substrate or desintegrating through incineration or sterilizing or mineralizing in the form of building materials.

As hereinbefore the product used for treating such waste waters is a basic binder such as the calcium sulphate semi-hydrate in the form BETA and/or in a more favourable manner calcium sulphate semi-hydrate in the form ALPHA of ordinary quality or grade or also the mixture of both aforesaid semi-hydrates whether added or not, admixed or not, blended or not with other hydraulic binders of mineral or organic origin, with chemical products which are themselves from mineral or organic origin and acting as purifiers, sterilizers, disinfectants, flocculating agents, agglomerating agents, bactericides, fongicides or on the contrary vectors of bacteria or fungus etc. possibly subjected or not to electrical or magnetic impulses.

The results of systematic tests undertaken within the scope of such applications and more particularly those relating to the selection of mineral and organic binders prove to be very variable whether they are used pure for some of them and/or in associated relationship for others, between themselves and/or with other materials and on condition of taking various precautions of use and of process according to the general scheme line defined by the gist of the invention and although the description thereof constitutes one of the many examples only which it is easy to set forth and comprising many alternative embodiments. It appears that it is the calcium sulphate semi-hydrate in the form ALPHA which makes it more possible than other binders to more easily sequestrate the particles in suspension irrespective of the volume of water present. It should be pointed out that the reaction of combination of the calcium sulphate semi-hydrates in the form BETA is generally attenuated in the presence of a large excess of water by a retention of liquid much more substantial than that occurring with calcium sulphate semi-hydrates in the form ALPHA. Moreover the latter are less sensitive to the presence of humid wastes. Thus the range of use of calcium sulphate semi-hydrates in the form ALPHA is not altered and the speed of sedementation remains substantially constant in any case.

The transformation of the waste waters and residual sludges into free water of clear and limpid appearance separated from the particles in suspension gathered and sequestrated on the bottom of a bassin in the shape of a "cake" of predetermined consistance relies on the following notions the mentioning of which is not exhaustive and the brief study of which is not limiting.

After powerful stirring of the calcium sulphate semi-hydrate in the form ALPHA selected used in a pure condition or admixed to other products either in the aqueous medium considered or "in a continuous fashion" when filling the bassin and which initially shows a powdery appearance with a specific gravity generally higher than 1 and which may often be up to 1.5 and even more there is noticed a preliminary phase of latent reaction corresponding to the "wetting" phase of the binder grains and which may very according to the qualities of the products used from a few seconds to a few minutes.

The subsequent hydratation of the grains would result in an increase in their specific gravity and in freeing a pH value slightly different from the initial pH which would "break" the phenomenon of suspension. Then very quickly a few millimeters of released water would appear at the surface of the bassin. The colloidal agglomeration would then start, would sustain itself and would accelerate during the whole phase of workability also referred to as "utilization range" which in fact corresponds to a preliminary setting of the binder or to the beginning of the latent resin crystallization. The crystals would grow (knowing that their shapes and their textures may be predetermined when making calcium sulphate semi-hydrate in the form ALPHA) appearing at will under the appearance of more or less long needles or of more or less bulky rectangular parallelepipedes. This particularity is of the greatest interest for the purpose of the optimized determination of a particular calcium sulphate semi-hydrate in the form ALPHA required by the best treatment of the waste waters and residual sludges in such or such a case. Therefore a calcium sulphate semi-hydrate in the form ALPHA may not be referred to in the singular but as calcium sulphate semi-hydrates in the form ALPHA in the plural.

The crystals then begin to move downwards towards the bottom of the bassin thereby generating a vertical autocinetic filtration effect directed from top to bottom which accounts for the relative slowness of sedimentation due to the "breaking" of the particles in suspension. The impurities would commingle in the crystalline network and are carried along faster and faster downwards as the crystals would grow further and would agglomerate while increasing in specific gravity under the action of the chemical combinations. The separation would stabilize within a short period of time of about 15 minutes and would allow two well limited parts to appear clearly: the one characterized by its limpid appearance consisting of clear water originating from the decomposition of the elements in suspension with respect to the other one represented by the combined sequestration binder and enclosing all the solid particles of the initial liquid.

It should be noted that the volume of water collected is maximum:

by using a calcium sulphate semi-hydrate in the suitable ALPHA form, when the setting is itself completed.

The hardening of the plate makes it possible to recover both decomposition products in an easy manner: the released water for being disposed of or recycled; the plate for being reduced and constitute depending on the case a soil improvement and a fertilizer or also a substrate for complementary chemical and organic fertilizers, converted into building materials or more simply incinerated. In other words with the method it is possible to obtain sludges sufficiently concentrated and of optimum consistance for being workable and the method therefore ensures a complete treatment and a final elimination of the residual sludges issuing in particular from the sewage treatment plans.

It is also important to point out that in view of the nature of the many additives which may be incorporated or basic binders some formulations of the products are usable advantageously for the safety and for the protection of the plants against fire as a coating, others for the extinction of fires through projection and spreading (for instance from a "canadair" type aircraft as powdery materials difficult to be decomposed by heat, some others for the obstructions of bores through incorporation of sludges and this owing to their high capabilities of hardening and controlling of their utilization range which is potentially variable at will.

In the examplary embodiment described in particular for the prevention of the pollution of beaches or shores and consisting advantageously of a movable vehicle it is obvious that it is possible to effect the same type of operations at a stationary location comprising a rotary mixers and an endless molding band for instance. This may be used in the case where substantial supplies of crude oil are available which are recovered and unusable owing to the fact it contains for instance waste materials, sea water, sand and so on.

In any case the products used by the method according to the invention are characterized by a non-destructive action and a perfect harmlessness with respect to the biomass and acting as a means for preserving vegetals and animals. Moreover some products released by some of their components may promote land and aquatic life and may serve as food to the phytoplancton.

It appears from the foregoing that the calcium sulphate semi-hydrates preferably in the form ALPHA are particularly advantageous for preventing pollution through liquid bodies such as for instance the hydrocarbons, the residual sludges. These applications are of course given by way of example only and it may quite be contemplated to apply the method according to the invention to other materials whether polluting or not which are present in liquid or pasty form.

It is important to note that the binders used according to the invention are preferably in powdery form before being used. Among the possible binders it should be recalled that anhydrites in the form ALPHA and/or BETA may also be used.

When processing hydrocarbons it is important to note that the method according to the invention would advantageously mix the basic binder used with fine materials such as additives and/or corser materials such as peat so as to substantially increase the sequestration and retention power. Other materials may also be added so as to give the product resulting from the treatment of the hydrocarbons by the binder a cavernous structure which would promote the restitution of gases and of burnable materials when this product is burned. In such a case it is advantageous to use as additional materials peat, waste wood, coal dust . . .

It is also important to note that in any case the hydraulic binder used is characterized by its non-destructive action and its perfect harmlessness with respect to the biomass and acting as a means for preserving vegetals and animals. Moreover, the products released by some components of the binders used would promote land and aquatic life and may serve as food to the phytoplancton.

When processing waste waters or residual sludges irrespective their origin and their consistance and whether previously treated or not, resulting or not from an aerobic or anaerobic transformation, stored or not in tanks, the method consists either in stirring in the liquid present or in mixing "in a continuous fashion" when filling up a bassin for instance a hydraulic binder such as previously defined used in a pure condition or associated with other materials, allowing the suspended material to decompose and to settle in order to recover the free or released water from the sequestrated particles gathered on the bottom and solidified. In this method it is important to note that the operation of decomposition is effected in one single phase and very quickly within about a few minutes. The binder used may also be admixed to other materials such as peat in order to give the sludges once treated a cavernous structure.

The invention is of course not limited to the embodiment which has been given by way of example only but it may comprise any stationary plant including in particular pumping, discharging, stirring, vibrating and other systems and it is not limited to the listed treatment products and to the applications given when all of these modifications are used within the scope of the appended claims.

What is claimed is:

1. Method of removing and recovering liquid sheets of hydrocarbon pollutants from the surface of the sea or present on coastal beaches or shores, residual sludges or waste waters, which comprises contacting said liquid sheets of hydrcarbon pollutants with, as hydraulic binder, calcium sulphate semi-hydrates in ALPHA quadratic form, wherein the same quickly sets, hardens, sequesters and retains said hydrocarbon pollutants in a form which is sufficiently firm to make it easily workable and recoverable.

2. A method according to claim 1, wherein said binder is admixed with at least another material which increases the sequestration and retention power of the binder.

3. A method according to claim 1, wherein sheets of hydrocarbons washed onto coastal beaches is mixed with a layer of predetermined thickness of said binder which sets and harden quickly in the presence of the sea water to yield a substantially continuous plate or slab which is easily removed to leave a stretch of clean ground.

4. A method according to claim 3, wherein pieces of said slab are reduced to granulates, burning said granulates the ashes of which free from any traces of hydrocarbons are composed almost exclusively of $SO_4Ca$, and grinding said ashes, thereby obtaining a product which can serve for improving heavy and clayed soils, the molecule of calcium sulphate breaking the molecule of clay.

5. A method according to claim 4, wherein at least one other material selected from the group consisting of peat, waste wood, and coal dust is added to said binder to impart to the resulting product after treatment of the polluting material by the binder a cavernous structure with considerable porosity for facilitating the restitution of gases and burnable materials when the resulting product is burned.

6. A method according to claim 3 wherein the flow rate of said binder is adjusted in accordance with the thickness of the layer of hydrocarbons to be sequestrated and with the desired percentage of retention.

7. A method according to claim 3, wherein the plate or slabe obtained after treatment of the layer of hydrocarbons by said binder is removed so as to allow for the exudation of excess water.

8. A method according to claim 1, wherein said binder is admixed with the layer of hydrocarbons to be sequestrated is stirred while avoiding a too large incorporation of said.

9. A method according to claim 1 for treating sheets of hydrocarbons at the surface of the sea, wherein said sheets are contacted with said binder to sequestrate the particles of hydrocarbons and obtain a good agglomeration of the various components and recovering the resulting product thus agglomerated by.

10. A method according to claim 9, wherein a floatable binder is used to float on the surface either as such or combined with water or with the sheets of hydrocarbons.

11. A method according to claim 10, characterized in that it consists in admixing said binder with a neutral coating powder having a high covering capacity.

12. A method according to claim 10, wherein said binder is adapted to undergo an expansion during the reaction with the hydrocarbons thereby promoting its floating capability.

13. A method according to claim 10, wherein said binder is densified.

14. A method according to claim 10, characterized in that it consists in using an aforesaid binder in pasty form.

* * * * *